April 26, 1949.  N. C. PRICE  2,468,461
NOZZLE RING CONSTRUCTION FOR TURBO POWER PLANTS
Filed May 22, 1943  2 Sheets-Sheet 2
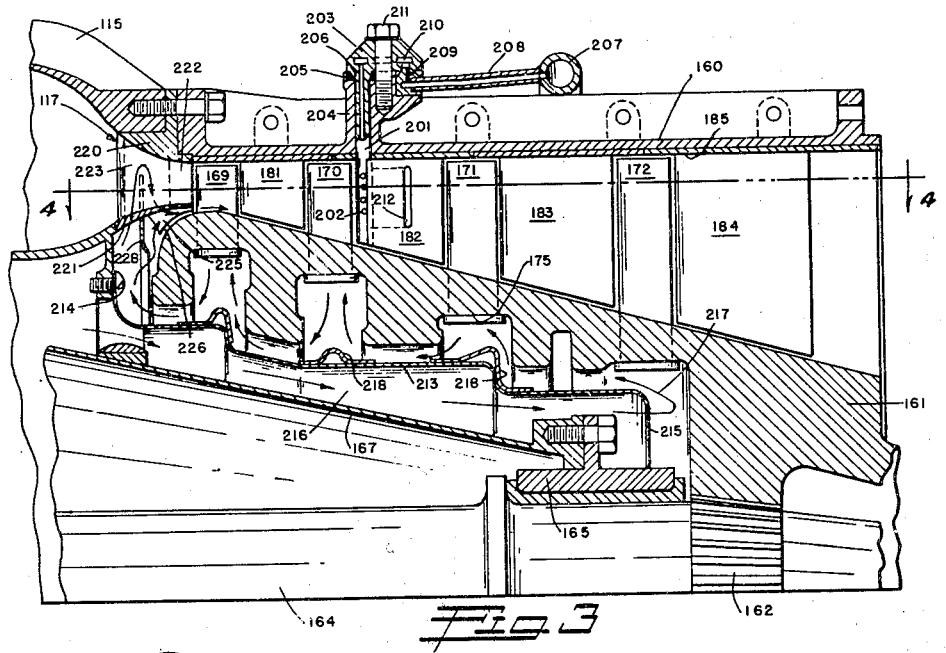
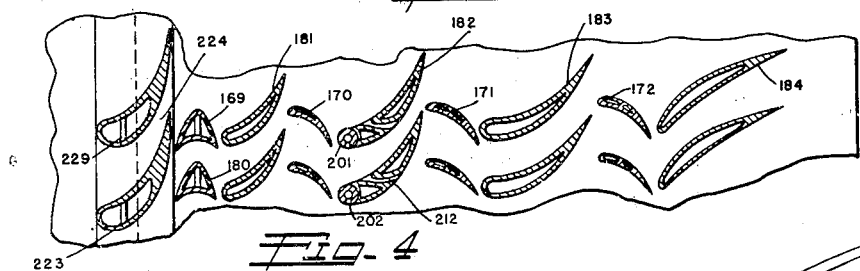
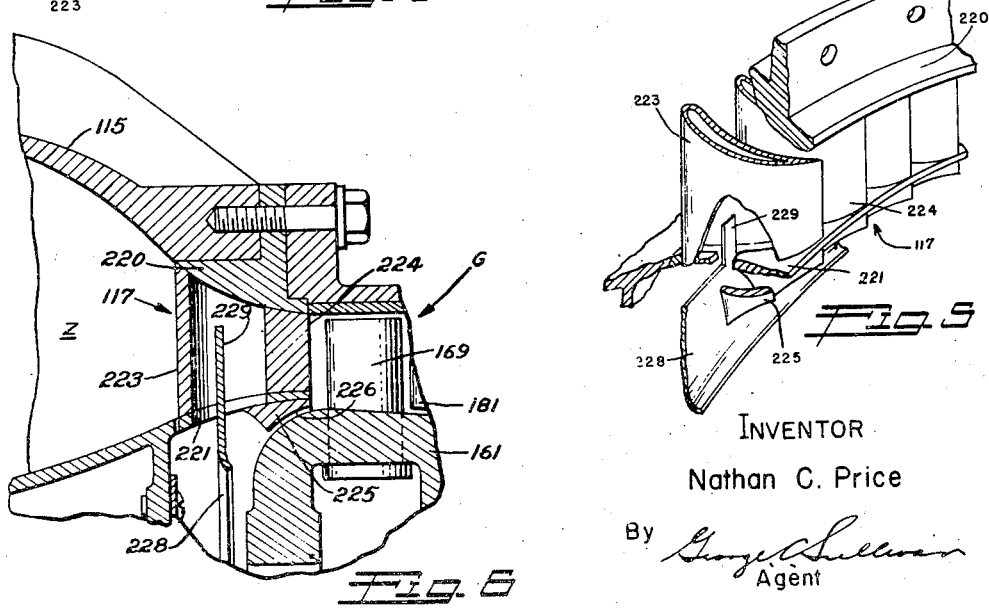
INVENTOR
Nathan C. Price
By George Sullivan
Agent Patented Apr. 26, 1949

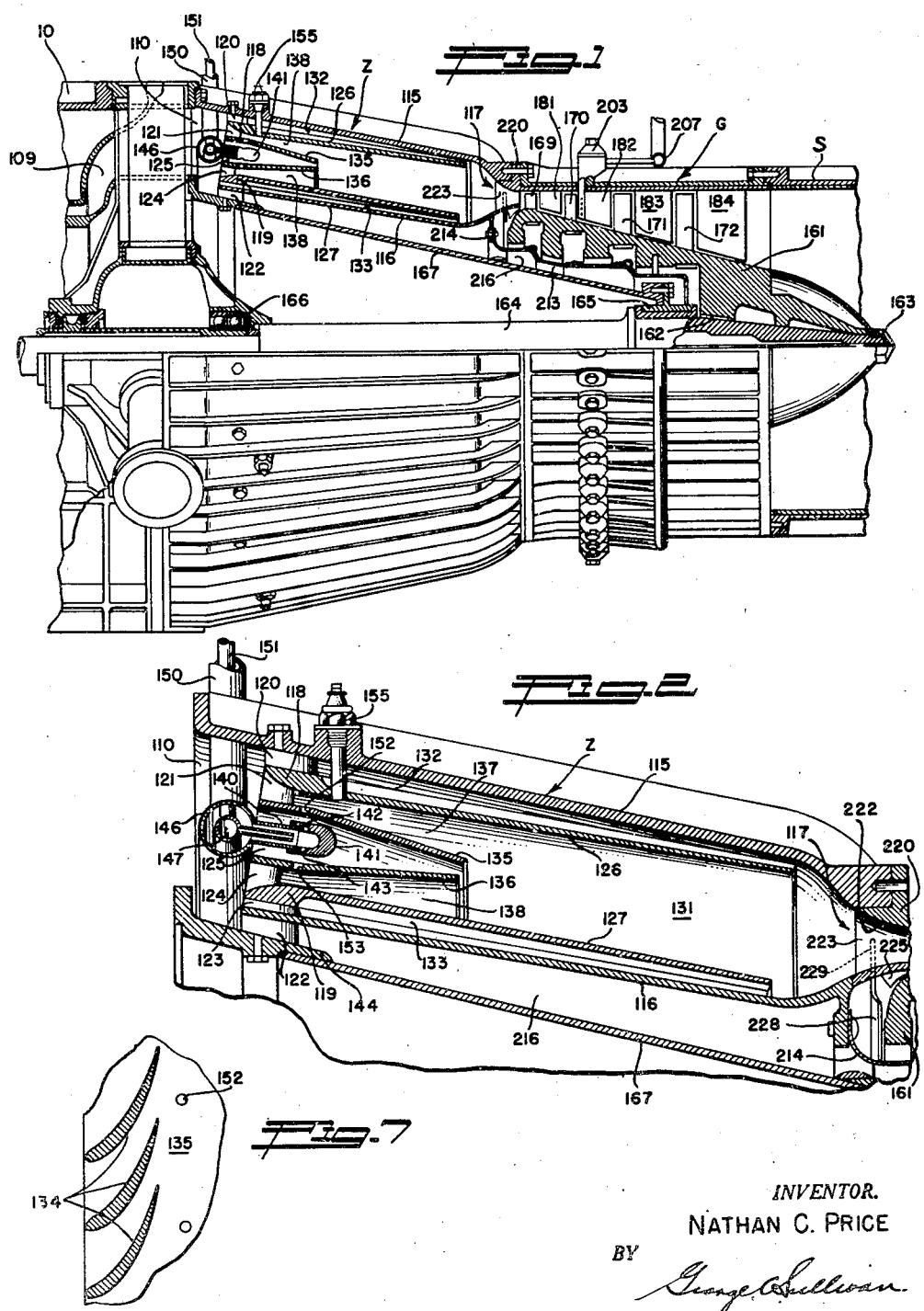

2,468,461

UNITED STATES PATENT OFFICE 2,468,461

NOZZLE RING CONSTRUCTION FOR TURBOPOWER PLANTS

Nathan C. Price, Hollywood, Calif., assignor to Lockheed Aircraft Corporation, Burbank, Calif.

Application May 22, 1943, Serial No. 488,029

6 Claims. (Cl. 60—41)

This invention relates to prime movers of the gas reaction type in general and more particularly to the internal combustion, reaction types of engines which function in the manner commonly known as "jet propulsion," and this application is a continuation-in-part of copending application, Serial Number 433,599, filed March 6, 1942. This invention finds its principal application as a power plant or prime mover for aircraft and the like high velocity vehicles and particularly high altitude airplanes designed for substratosphere or stratosphere flight.

The present invention is embodied in an internal combustion gas turbine power plant and is concerned primarily with the nozzle ring arranged between the combustion chamber and the entrance to the expansion zone of the turbine. The nozzle ring and adjacent parts of a gas turbine power plant are subjected to exceedingly high temperatures by reason of the high pressure gases of combustion passing from the combustion chamber into the turbine. The turbine rotor is likewise subjected to the high temperature gases. It is, accordingly, desirable to make provision for the cooling of the nozzle ring elements and the adjacent portion of the turbine rotor.

It is an object of this invention to provide a practical efficient nozzle ring arrangement for the entrance of a gas turbine incorporating adequate cooling means. In accordance with the invention cooling air is circulated through the swirl vanes of the ring assembly and is directed against the inner annulus of the assembly to effectively cool the same.

Another object of the invention is to provide a gas turbine nozzle ring construction wherein a cooling air nozzle discharges air into the expansion zone of the turbine in a manner to form a protective layer of relatively cool air which flows over the surface of the turbine rotor. The construction of the invention has a first annular nozzle for discharging the combustion gases into the expansion zone of the turbine and has a second annular nozzle for discharging relatively cool air axially along the external surface of the turbine rotor. The expansion of the cooling air at this second nozzle materially assists in cooling the nozzle ring.

A further object of the invention is to provide a nozzle ring of the character described incorporating hollow swirl vanes for imparting a spiral motion to the combustion gases discharging into the expansion zone of the turbine and further includes a baffle means for diverting a portion of the aforementioned cooling air in a manner to continuously circulate through the hollow swirl vanes to cool the same.

A still further object of the invention is to provide an air cooled nozzle ring of the class described that is constructed to provide for the recovery of the dynamic energy of the cooling air discharged into the turbine.

Figure 1 is a partial, longitudinal, sectional view of a gas turbine power plant embodying the invention;

Figure 2 is an enlarged fragmentary sectional view illustrating the combustion chamber and nozzle ring;

Figure 3 is an enlarged fragmentary sectional view of the turbine illustrating the manner in which cooling air is circulated through the turbine rotor and nozzle ring;

Figure 4 is a fragmentary sectional view taken substantially as indicated by line 4—4 on Figure 3 illustrating the blading of the turbine and nozzle ring;

Figure 5 is a fragmentary perspective view of the nozzle ring with certain parts appearing in cross section;

Figure 6 is an enlarged fragmentary sectional view illustrating the nozzle ring; and Figure 7 is a fragmentary sectional view showing the swirl vanes at the entrance of the combustion chamber.

In the drawings, I have shown the invention embodied in a turbo power plant of the type disclosed in my co-pending application referred to above. The portion of the power plant illustrated comprises a combustion chamber Z, a gas turbine G, and a nozzle ring means 117 between the combustion chamber and turbine.

The combustion chamber Z receives air under pressure from the compressor means of the power plant. In the present case it may be assumed that the engine embodies a multi-stage compressor system arranged ahead of or at the upstream end of the combustion chamber. A generally cylindrical housing 10 contains the multi-stage compressor and an annular passage 109 extends from the final stage compressor (not shown) to the entrance 110 of the combustion chamber Z.

The combustion chamber Z into which the final stage compressor discharges, is an approximately annular space of slightly diminishing average diameter towards its outlet, defined on the outside by the ribbed housing 115 and on the inside by a concentric partition 116, both preferably fabricated from a heat resistant material such as a nickel-chromium-iron alloy. The combustion chamber Z converges at the rear portion to an annular nozzle 117 having an outlet passage of reduced area and containing in the portion of reduced area the nozzle ring structure 117 embodying a plurality of circumferentially spaced airfoil shaped vanes as hereinafter more fully described.

The forward or inlet end of the combustion chamber is defined by a pair of concentrically positioned annular shaped ring structures 118 and 119 attached respectively to the outer and inner walls of the combustion chamber and with the outer ring having two concentric, annular rows of circumferentially spaced openings as shown at 120, 121, and the inner ring having three concentric rows as shown at 122, 123 and 124. A centrally positioned annular opening is formed at 125 between the said two ring structures. A pair of substantially annular shaped and concentrically positioned shroud members 126 and 127 are attached to and extend rearwardly into the combustion chamber from the beforementioned oppositely positioned ring structures at points intermediate the two annular rows of spaced openings in each ring structure to form an approximately annular combustion zone at 131 therebetween. Relatively narrow annular air spaces 132 and 133 are provided between the combustion zone shrouds and the enclosing walls 115 and 116 of the combustion chamber. The outer annular rows of openings 120 and 123 make connection between the inlet passage 110 and the said annular air spaces 132 and 133 surrounding the combustion zone.

The inner annular rows of openings 121 and 124 are formed by a plurality of radially disposed airfoil shaped swirl vanes arranged at angles to the longitudinal axis of the combustion zone assembly as best illustrated at 134 in Figure 7.

At the inner margins of the ring shaped structures defining the beforementioned centrally positioned annular opening 125 are a second pair of concentrically disposed inner shroud members 135 and 136 extending into the forward portion of the combustion zone 131, said inner shroud members being shaped to converge toward their inner ends to form in effect an approximately annular shaped central nozzle passage. The intermediate passages 137 and 138 thus defined leading into the combustion zone from the vaned openings 121 and 124 between the inner shroud members 135 and 136 and the outer shroud members 126 and 127 are venturi shaped in cross-sectional appearance.

A plurality of fuel spray jets extend into the forward portion of the beforedescribed central annular nozzle passage 125 at the entrance to the combustion zone as best shown at 140 in Figure 2 and each spray jet carries at the inner end a spray head 141 provided with a pair of laterally directed orifices 142 and 143. The spray heads are supported by and supplied with a mixture of liquid fuel and injection air by pairs of concentric pipe nipples which make connection with concentrically arranged circular pipe manifolds 146 and 147 contained within the annular duct leading to the entrance of the combustion chamber. The exterior circular manifold 146 is adapted to be supplied with air under suitable pressure through a lead-in pipe 150 and the interior manifold 147 is adapted to be supplied with liquid fuel under pressure through a concentric lead-in pipe 151.

The beforementioned converging shrouds 135 and 136 between which the fuel spray jets extend are provided with apertures as shown at 152 and 153 opposite and coaxially aligned with each of the laterally directed jet head orifices whereby an atomized mixture of fuel and air may be projected into the contracted portion of the Venturi shaped air passages 137 and 138 leading into the combustion zone. The combustion chamber construction forms the subject matter of my divisional application, Serial No. 579,757, filed February 26, 1945.

A plurality of glow plugs as shown at 155 make threaded connection into the combustion chamber housing and extend into openings provided in the outer combustion zone shroud 126. The glow plugs serve as the initial igniting means for the combustible fuel-air mixture which is formed in and flows through the forward end of the combustion zone.

The gas turbine G is contained within a cylindrical housing 160 and comprises a hollow rotor 161 having the general shape of a truncated cone which is coaxially positioned within the said power plant with the end of minimum diameter facing rearwardly in the direction of flow of the propellant gases to form an expansion zone of increasing cross-sectional area between said rotor and the inside surface of said housing. The turbine rotor 161 is splined at 162 and bolted at 163 to the rear end of a hollow shaft 164 which is in turn rotatably supported concentrically within the power unit upon a rear main bearing 165 and a forwardly located auxiliary bearing 166. The rotor shaft main bearing 165 is supported by means of a hollow, conically shaped cantilever housing member 167 attached at its forward end of largest diameter 144 to the housing structure which separates the final stage compressor housing from the combustion zone and gas turbine housing.

Power is transmitted from the turbine shaft 164 to the compressor means, not shown.

The gas turbine rotor is provided with a plurality of rows of hollow impeller blades or buckets as best shown at 169—172 in Figure 3 and which may be constructed of heat resistant, high strength metal such as a nickel-chromium-iron alloy. The said turbine rotor blades are adapted to be inserted from the inside of the rotor cavity and to make light press fits through suitably shaped openings broached in the rotor shell and during rotation they are held firmly in place against shoulders 175 by the resulting centrifugal forces.

The first row of impeller blades 169 are preferably of the impulse bucket type as shown in Figure 4 while the balance of the blades are of the reaction type having cambered airfoil sections.

The impulse buckets 169 are hollow and have communication with the interior of the rotor shell cavity.

The reaction type impeller blades 170, 171 and 172 are also each provided with a pair of ducts through which cooling air may circulate from the rotor shell cavity. The turbine blade cooling means forms the subject matter of my divisional application, Serial No. 576,655, filed February 7, 1945.

A plurality of rows of turbine intermediates or stator blades as shown at 181, 182, 183 and 184 are fixed intermediate the beforementioned impeller blade rows and supported from the inner surface or lining 185 of the turbine housing as shown in Figure 3.

An intermediate row of stationary vanes is provided with fuel injection means. Each of such vanes is formed with a cambered airfoil shaped trailing body portion 182 and a detachable tubular leading edge element 201. The tubular element 201 is provided with a row of a plurality of apertures 202 opening out on to the convex side of the vane adjacent its closed inner end and makes connection at its outer end with a compression union 203 located on the outside of the housing. The tubes 201 are adapted to be inserted and withdrawn from the turbine through special fittings 204 attached to or forming a part of the turbine housing. Liquid tight seal is provided between the tube 201 and the fitting 204 by suitable packing 205 in the fitting 204 upon which the conical nipple 206 of the compression union 203 rests.

Liquid fuel or a mixture of liquid fuel and air under suitable pressure is supplied from a ring manifold 207 to the intermediate injection tubes 201 by way of a plurality of lateral tubes 208, nipples 209, and ducts 210 in the compression union 203. Studs 211 serve to compress the union 203 into liquid tight contact with nipples 209 and the packing 206 retained in fittings 204 and also to retain the fuel injection tube 201 in place in the expansion zone.

The trailing or body portions of the intermediate vanes 182 are provided with diagonal slots 212 through which a portion of the combustion gases may pass and intermix with atomized fuel which has been introduced at 202. The intermediate fuel injection system forms the subject matter of my divisional application, Serial No. 578,302, filed February 16, 1945.

A tubular baffle 213 of stepwise diminishing diameter and spaced from but conforming in form generally with the inside surface contour of the turbine rotor shell is attached at 214 to the rearward inner wall of the combustion chamber and extends rearwardly to a point 215 adjacent the rear end of the rotor cavity. The diverging annular space 216 thus defined between the conical bearing support 167 and the said inner wall 116 of the combustion chamber and the baffle 213 serves to conduct cooling air under pressure from the annular duct 122 at the entrance 110 of the combustion chamber rearwardly to the inner apex of the turbine rotor cavity adjacent the main bearing 165 and thence forward, counter-current to the propellant gases in the turbine as shown by arrows 217 and along the inner surface of the turbine rotor cavity in contact with the inner ends of the impeller blade roots and finally to the openings in the annular nozzle ring 117 in the outlet from the combustion chamber. My copending application Serial Number 573,562, filed January 19, 1945, describes and claims the means for directing cooling air through the turbine rotor cavity to cool the rotor.

A number of convex circular barriers 218 attached to the baffle 213 serve to deflect cooling air into contact with the inner root ends of the turbine impeller blades.

A small portion of the cooling air thus conducted to the inside surface of the turbine rotor flows into the impulse buckets 169 and the reaction type blades 170, 171 and 172.

The nozzle ring 117 is constructed of a pair of concentric rings 220 and 221 with adjacent convex surfaces so shaped and positioned as to form a smoothly curved diverging nozzle passageway as best shown at 222 in Figures 2 and 3. A plurality of circumferentially spaced cambered airfoil shaped vanes 223 each set at an angle with respect to the longitudinal axis of the unit extend radially between the said inner curved surfaces of the said nozzle rings 220 and 221. The vanes 223 have or define a plurality of contracted passages as best shown at 224 in Figure 4 and serve to impart a spiral flow or swirl to the combustion gases entering the first row of turbine buckets.

On the inner side of the inner nozzle ring 221, short curved extensions of the trailing edge portions of the vanes 223 are provided as shown at 225 in Figures 3, 5 and 6. The rearward lower edges of these vane extensions are curved to conform with and provide slight clearance from the rounded forward end of the rotor shell as shown at 226 and the passage thus formed between the inner surface of the nozzle ring 221 and the adjacent rounded surface 226 of the rotor 161 forms in effect a second nozzle entrance to the turbine expansion zone for introduction of heated cooling air from the rotor cavity.

An annular baffle plate 228 having outwardly extending tongues 229 projecting into the inner open ends of the hollow nozzle vanes 223 serves to divert through the said vanes a portion of the cooling air leaving the rotor cavity.

During operation of the power plant the turbine G drives the multi-stage compressors through the medium of the shaft 164. The compressed air issues from the final stage compressor into the annular duct 109 to flow into the entrance 110 of the combustion chamber Z. Under typical operating conditions the compressors will supply air to the combustion chamber entrance 110 at a pressure in the order of 134 pounds per square inch absolute.

At the entrance 110 to the combustion chamber the compressed air is divided, a major portion flowing through the vaned annular inlets 121 and 124 and through the Venturi shaped annular passages 137 and 138 to the combustion zone 131 in chamber Z. Another portion of the compressed air passes through the annular openings 120 and 123 and thence through the substantially annular clearance spaces 132 and 133 between the combustion zone shrouds and the combustion chamber housing, and still another minor portion of the compressed air enters at the central annular opening 125 and flows through the nozzle shaped annular passage between the inner shrouds 135 and 136 which serves to cool the spray nozzle and spray head 141. The balance of the compressed air from duct 110 passes through the openings at 122 and flows down through the tapering, substantially annular passage 216 formed between the conical shaped main bearing support 167 and the inner shroud 116 of the combustion chamber and its baffle extension 213 to the inner apex of the gas turbine rotor cavity adjacent the main rotor bearing 165. From there a portion of the cooling air turns as indicated by arrow 217, best shown in Figure 3, and flows forward along the inner surface of the turbine rotor shell and in heat exchange contact with the inner ends of the impeller blade roots and finally is exhausted to the gas turbine expansion zone inlet through the hereinbefore described annular shaped cooling air nozzle ring passageway 226 where it joins in laminar flow the combustion gases issuing from the combustion zone 131 in chamber Z. A portion of the cooling air prior to being exhausted through the vaned cooling air nozzle passageway 226 is deflected by the annular baffle plate 228 and the extending tongues 229 and is thereby caused to circulate through the hollow airfoil shaped vanes 223 and returned to the before-mentioned cooling air nozzle ring passageway 226. The cooling air thus flows from the annular inlet nozzle 226 at a point adjacent the surface of the turbine rotor surface and forms thereby a concurrently flowing layer of relatively cool air intermediate the hot propellant combustion gases and the said outer surface of said rotor. This relatively cool boundary layer of air serves to cool and to shield the turbine rotor surface and the exposed portions of the blade roots from the high temperature gases.

That portion of the compressed air which passes through the Venturi shaped passages 121 and 124 of the entrance to the combustion zone meets and mixes with the atomized spray of fuel projected from the perforations 142 and 143 in the spray nozzle head 141, through the holes 152 and 153 in the inner shroud members 135 and 136. The resultant fuel-air mixture, once ignited by the hot filament of the glow plug 155, continues to burn throughout a substantial length of the combustion zone 131 in chamber Z. The angularly set vanes 134 in the said passages 121 and 124 impart a rapid spiral motion to the aforesaid mixture of the fuel and air issuing through the annular passages 137 and 138 and where this spirally moving mixture meets the axially flowing air from the central and adjacent passageways rapid and thorough mixing of the fuel and combustion air is effected. The rotation of the burning gases in the combustion zone is preferably in the same direction as that imparted to the combustion gases leaving the turbine inlet nozzle ring 117 whereby a portion of the rotational kinetic energy is conserved.

The heated gaseous combustion products and excess air are continuously released from the combustion chamber through the restricted openings 224 formed between the vanes 223 in the annular nozzle ring 117 and into the initial stages of the gas turbine expansion zone. The metal of the nozzle ring 117 through which the heated combustion gases pass is cooled, as hereinbefore described, by the expansion of cooling air in the adjoining cooling air nozzle passage formed between ring 221 and the curved surface 226 of the rotor and also by the air circulating through the interior of vanes 223.

The expanded and partially cooled gases from which a portion of the power has been extracted in passing through the gas turbine in the form of rotative torque applied to the turbine shaft 164 are discharged axially from the gas turbine expansion stages into the tail pipe S and thence out through the nozzle (not shown) in the form of a rearwardly directed and efficiently expanded high velocity reactive gaseous jet. The propulsive force exerted by the reaction of the gases leaving the said nozzle is the thrust which may be utilized in whole or in part to propel the unit and the vehicle with which it is associated.

For the purpose of increasing the power output of the turbine and to augment the propulsive jet thrust additional fuel either alone or admixed with the air may be injected into the intermediate portion of the turbine expansion zone through the plurality of injection pipes 201 which are fed under pressure from a suitable source through the manifold 207, laterals 208 and pressure couplings 203 as hereinbefore described. The combustion gases, rich with unconsumed air supports the combustion in the intermediate injection zone and proper mixture of injected fuel and gases is aided by providing a diagonal slot 212 extending through the intermediate vane 182 at a point immediately downstream from the point of fuel introduction. The said slot 212 also serves to broaden the efficient operating range of angles of attack of gases passing therethrough from earlier stages of the turbine.

From the foregoing it will be evident that the invention may have a number of equivalent embodiments and arrangements of associated components. It is to be understood, therefore, that the foregoing is not to be limiting but may include any and all form of apparatus which are included within the scope of the claims.

I claim:

1. In a gas reaction propulsive unit, apparatus comprising in combination a housing carrying a plurality of stationary counter-vanes, a rotor in said housing carrying a plurality of impeller blades adapted to rotate intermediate said counter-vanes, the space between said housing and said rotor forming an expansion zone, a combustion chamber, a nozzle of contracted area interconnecting said combustion chamber and said expansion zone, said nozzle comprising a plurality of hollow vanes each positioned at an angle with respect to the axis of flow of said expansion zone to impart an initial spiral motion of gases entering said expansion zone, nozzle means for introducing cooling air into the forward end of the expansion zone adjacent the surface of the rotor, and means for diverting cooling air from said nozzle means to flow through the interior of said nozzle vanes and for returning said cooling air flowing from said nozzle vanes into said nozzle means.

2. In a gas reaction propulsive unit, apparatus comprising in combination a housing carrying a plurality of stationary counter-vanes, a rotor in said housing carrying a plurality of impeller blades adapted to rotate intermediate said counter-vanes, the space between said housing and said rotor forming an expansion zone, a combustion chamber and a nozzle of contracted area interconnecting said combustion chamber and said expansion zone, said nozzle comprising a plurality of hollow vanes each positioned at an angle with respect to the axis of flow of said expansion zone to impart an initial spiral motion of gases entering said expansion zone, nozzle means for introducing cooling air into the forward end of the expansion zone adjacent the surface of the rotor, and means to circulate cooling air through the interiors of said nozzle vanes for discharge into the last named nozzle means.

3. In a gas reaction propulsive unit, apparatus comprising in combination, a housing carrying a plurality of stationary counter-vanes, a rotor in said housing carrying a plurality of impeller blades adapted to rotate intermediate said counter-vanes, the space between said housing and said rotor forming an expansion zone, a combustion chamber, a nozzle of contracted area interconnecting said combustion chamber and said expansion zone, said nozzle comprising a concentric pair of approximately annular shaped bodies adapted to form therebetween an annular passage extending between said combustion chamber and said expansion zone and a plurality of hollow vanes extending radially between said annular shaped bodies, each positioned at an angle with respect to the axis of flow of said expansion zone to impart an initial spiral motion of gases entering said expansion zone, means for introducing cooling air into corresponding ends of at least certain of said nozzle vanes to circulate through the interiors thereof and then flow from said ends of the vanes, and means for introducing said cooling air flowing from said nozzle vanes into the forward end of the expansion zone.

4. In a power plant the combination of, a housing carrying stationary counter vanes, a rotor operable in the housing and carrying impeller blades, the space between the housing and rotor forming an expansion zone, spaced substantially concentric tubular walls defining a combustion chamber, a nozzle between the combustion chamber and expansion zone comprising a first ring between the housing and the outermost of said walls, a second ring at the inner wall spaced within the first ring to define a contracted nozzle and spaced from the rotor to leave a second contracted nozzle for cooling air, said nozzles discharging into the forward end of said expansion zone, substantially radial guide vanes extending between said rings and arranged to impart rotary motion to the gases passing through the first named nozzle, and extensions on said guide vanes extending into said second nozzle for imparting rotary motion to the cooling air entering said expansion zone.

5. In a power plant the combination of, a housing carrying stationary counter vanes, a rotor operable in the housing and carrying impeller blades, the space between the housing and rotor forming an expansion zone, an annular combustion chamber, a nozzle between the combustion chamber and said expansion zone comprising inner and outer rings in spaced generally concentric relation, and hollow vanes extending between the rings arranged to impart a rotary motion to the gases passing through the nozzle, said inner ring being spaced from the surface of the rotor to leave a passage for conducting cooling air into the expansion zone, and a baffle in said passage for diverting cooling air into the hollow vanes.

6. In a power plant the combination of, a housing carrying stationary counter vanes, a rotor operable in the housing and carrying impeller blades, the space between the housing and rotor forming an expansion zone, an annular combustion chamber, a nozzle between the combustion chamber and said expansion zone including inner and outer annular members in spaced generally concentric relation, said inner member being spaced from the rotor to leave a passage for conducting cooling air into the forward end of said expansion zone, hollow swirl vanes extending substantially radially between said members and arranged to impart a rotary motion to the gases passing through the nozzle, the interiors of the vanes being in communication with said passage, baffle means in said passage for diverting cooling air into said hollow vanes, and parts on the baffle means extending into the hollow vanes to cause the cooling air to circulate through the vanes and return to said passage.

NATHAN C. PRICE.

REFERENCES CITED

The following references are of record in the file of this patent:

UNITED STATES PATENTS

| Number | Name | Date |
| --- | --- | --- |
| 930,495 | Schmidt | Aug. 10, 1909 |
| 1,894,276 | Lampton | Jan. 17, 1933 |
| 2,085,761 | Lysholm | July 6, 1937 |
| 2,149,510 | Darrieus | Mar. 7, 1939 |
| 2,243,467 | Jendrassik | May 27, 1941 |
| 2,244,467 | Lysholm | June 3, 1941 |
| 2,280,835 | Lysholm | Apr. 28, 1942 |
| 2,314,058 | Stalker | Mar. 16, 1943 |
| 2,315,610 | Flanders | Apr. 6, 1943 |
| 2,326,072 | Seippel | Aug. 3, 1943 |
| 2,332,866 | Müller | Oct. 26, 1943 |
| 2,333,053 | Stroehlen | Oct. 26, 1943 |
| 2,364,189 | Büchi | Dec. 5, 1944 |
| 2,396,911 | Anxionnaz et al. | Mar. 19, 1946 |
| 2,404,334 | Whittle | July 16, 1946 |
| 2,405,164 | Pavlecka | Aug. 6, 1946 |

FOREIGN PATENTS

| Number | Country | Date |
| --- | --- | --- |
| 781,057 | France | Feb. 18, 1935 |
| 346,599 | Germany | Jan. 5, 1922 |
| 619,216 | Germany | Sept. 28, 1935 |
| 696,062 | Germany | Sept. 10, 1940 |
| 100,283 | Switzerland | July 16, 1923 |